United States Patent
Hegde et al.

(10) Patent No.: US 11,358,908 B2
(45) Date of Patent: Jun. 14, 2022

(54) ENHANCED EFFICIENCY FERTILIZER WITH UREASE INHIBITOR AND NITRIFICATION INHIBITOR IN SEPARATE PARTICLES

(71) Applicant: SABIC GLOBAL TECHNOLOGIES B.V., Bergen op Zoom (NL)

(72) Inventors: Ravi Hegde, Bangalore (IN); Rajamalleswaramma Koripelly, Bangalore (IN); Chandra Mohana, Bangalore (IN); Radha Achanath, Bangalore (IN); Samik Gupta, Bangalore (IN); Sabeshan Kanagalingam, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 236 days.

(21) Appl. No.: 16/605,610

(22) PCT Filed: Apr. 16, 2018

(86) PCT No.: PCT/IB2018/052630
§ 371 (c)(1),
(2) Date: Oct. 16, 2019

(87) PCT Pub. No.: WO2018/193358
PCT Pub. Date: Oct. 25, 2018

(65) Prior Publication Data
US 2020/0131098 A1    Apr. 30, 2020

Related U.S. Application Data

(60) Provisional application No. 62/487,260, filed on Apr. 19, 2017.

(51) Int. Cl.
*C05G 3/90*    (2020.01)
*C05C 9/00*    (2006.01)
(Continued)

(52) U.S. Cl.
CPC .............. *C05G 3/90* (2020.02); *C05C 9/00* (2013.01); *C05C 9/005* (2013.01); *C05C 11/00* (2013.01);
(Continued)

(58) Field of Classification Search
None
See application file for complete search history.

(56) References Cited

U.S. PATENT DOCUMENTS

| 3,056,723 A | 10/1962 | Galloway |
| 3,232,740 A | 2/1966 | Sor et al. |

(Continued)

FOREIGN PATENT DOCUMENTS

| AU | 667645 | 2/1995 |
| AU | 2015212412 | 9/2016 |

(Continued)

OTHER PUBLICATIONS

Lookchem. "Hydroxypropyl methyl cellulose," https://www.lookchem.com/Hydroxypropyl-methyl-cellulose/ pp. 1-2, 2015.
(Continued)

*Primary Examiner* — Wayne A Langel
(74) *Attorney, Agent, or Firm* — Norton Rose Fulbright US LLP

(57) ABSTRACT

Particulate fertilizer compositions that include nitrification inhibitors and urease inhibitors are described herein. The inhibitors are separated from each other by being in separate particles. Fertilizer particles in the composition include particles having a core-shell structure, with an inhibitor included in the core particle.

16 Claims, 2 Drawing Sheets

(51) Int. Cl.
  *C05C 11/00* (2006.01)
  *C05G 5/35* (2020.01)
  *C05G 5/30* (2020.01)
  *C05G 5/40* (2020.01)

(52) U.S. Cl.
  CPC ................ *C05G 5/30* (2020.02); *C05G 5/35* (2020.02); *C05G 5/40* (2020.02)

(56) References Cited

U.S. PATENT DOCUMENTS

| | | | |
|---|---|---|---|
| 3,300,294 | A | 1/1967 | Hollstein |
| 3,314,778 | A | 4/1967 | Campbell et al. |
| 3,322,528 | A | 5/1967 | Hamamoto |
| 3,326,665 | A | 7/1967 | Schäfer et al. |
| 3,331,677 | A | 7/1967 | Campbell et al. |
| 3,388,989 | A | 6/1968 | Sor |
| 3,400,011 | A | 9/1968 | Fox |
| 3,441,539 | A | 4/1969 | Schafer et al. |
| 3,499,748 | A | 3/1970 | Fraser |
| 3,825,414 | A | 6/1974 | Lee et al. |
| 3,870,755 | A | 3/1975 | Kamo et al. |
| 3,954,436 | A | 5/1976 | Vad et al. |
| 3,961,329 | A | 7/1976 | Naidich |
| 3,962,329 | A | 7/1976 | Schoenaich et al. |
| 4,062,890 | A | 12/1977 | Shank |
| 4,082,533 | A | 4/1978 | Wittenbrook et al. |
| 4,880,455 | A | 11/1989 | Blank |
| 4,994,100 | A | 2/1991 | Sutton et al. |
| 5,124,451 | A | 7/1992 | Hackl et al. |
| 5,169,954 | A | 12/1992 | Hackl et al. |
| 5,219,465 | A | 6/1993 | Goertz et al. |
| 5,264,019 | A | 11/1993 | Gossett, Jr. et al. |
| 5,300,135 | A | 4/1994 | Hudson et al. |
| 5,352,265 | A | 10/1994 | Weston et al. |
| 5,399,186 | A | 3/1995 | Derrah et al. |
| 5,405,426 | A | 4/1995 | Timmons |
| 5,414,083 | A | 5/1995 | Hackl et al. |
| 5,466,274 | A | 11/1995 | Hudson et al. |
| 5,476,528 | A | 12/1995 | Trimm |
| 5,597,917 | A | 1/1997 | Hackl et al. |
| 5,645,624 | A | 7/1997 | Naka et al. |
| 5,741,521 | A | 4/1998 | Knight et al. |
| 5,803,946 | A | 9/1998 | Petcavich et al. |
| 5,851,261 | A | 12/1998 | Markusch et al. |
| 5,862,610 | A | 1/1999 | Lipert |
| 5,917,110 | A | 6/1999 | Kust |
| 5,976,210 | A | 11/1999 | Sensibaugh |
| 6,048,376 | A | 4/2000 | Miller |
| 6,048,378 | A | 4/2000 | Moore |
| 6,231,633 | B1 | 5/2001 | Hirano et al. |
| 6,391,454 | B1 | 5/2002 | Mao et al. |
| 6,500,223 | B1 | 12/2002 | Sakai et al. |
| 6,576,035 | B2 | 6/2003 | Hartmann et al. |
| 6,749,659 | B1 | 6/2004 | Yu et al. |
| 6,900,162 | B2 | 5/2005 | Wertz et al. |
| 6,936,573 | B2 | 8/2005 | Wertz et al. |
| 6,936,681 | B1 | 8/2005 | Wertz et al. |
| 7,213,367 | B2 | 5/2007 | Wertz et al. |
| 8,163,058 | B2 | 4/2012 | Whitehurst |
| 8,419,819 | B2 | 4/2013 | Sutton |
| 8,603,211 | B2 | 12/2013 | Rahn et al. |
| 9,034,072 | B2 | 5/2015 | Gabrielson et al. |
| 9,376,350 | B2 | 6/2016 | Pursell et al. |
| 9,394,210 | B2 | 7/2016 | Gabrielson et al. |
| 9,422,203 | B2 | 8/2016 | Waliwitiya |
| 9,446,993 | B2 | 9/2016 | Li et al. |
| 2003/0224031 | A1 | 12/2003 | Heier et al. |
| 2004/0001884 | A1 | 1/2004 | Moroni et al. |
| 2004/0016275 | A1 | 1/2004 | Hartmann et al. |
| 2004/0016276 | A1 | 1/2004 | Wynnyk et al. |
| 2004/0050127 | A1 | 3/2004 | Ambri |
| 2004/0163434 | A1 | 8/2004 | Quin |
| 2004/0182953 | A1 | 9/2004 | Knoer |
| 2006/0089259 | A1 | 4/2006 | Driessen et al. |
| 2006/0142157 | A1 | 6/2006 | Birthisel et al. |
| 2009/0270257 | A1 | 10/2009 | Pursell et al. |
| 2009/0317468 | A1 | 12/2009 | Letmathe et al. |
| 2010/0011825 | A1 | 1/2010 | Ogle et al. |
| 2010/0139348 | A1 | 6/2010 | Wan et al. |
| 2011/0036009 | A1 | 2/2011 | Bissonnette et al. |
| 2011/0154873 | A1 | 6/2011 | Burnham et al. |
| 2011/0275520 | A1 | 11/2011 | Frey et al. |
| 2012/0017659 | A1 | 1/2012 | Pursell et al. |
| 2012/0067094 | A1 | 3/2012 | Pursell et al. |
| 2012/0090366 | A1 | 4/2012 | Pursell et al. |
| 2013/0152649 | A1 | 6/2013 | Kweeder et al. |
| 2013/0231493 | A1 | 9/2013 | Shishkov et al. |
| 2013/0305796 | A1 | 11/2013 | Hudson et al. |
| 2014/0033779 | A1 | 2/2014 | Bertin et al. |
| 2014/0047884 | A1 | 2/2014 | Gabrielson et al. |
| 2014/0102156 | A1 | 4/2014 | Pursell et al. |
| 2014/0223978 | A1 | 8/2014 | Kuo et al. |
| 2014/0230322 | A1 | 8/2014 | Zhang et al. |
| 2014/0255605 | A1 | 9/2014 | Van Kaathoven et al. |
| 2015/0031786 | A1 | 1/2015 | Lambeth |
| 2015/0047402 | A1 | 2/2015 | Walker et al. |
| 2015/0052960 | A1 | 2/2015 | Makin et al. |
| 2015/0101379 | A1 | 4/2015 | Gabrielson et al. |
| 2015/0125639 | A1 | 5/2015 | Rosen |
| 2015/0152017 | A1 | 6/2015 | Schumski et al. |
| 2015/0197460 | A1 | 7/2015 | Gabrielson et al. |
| 2015/0239790 | A1 | 8/2015 | Iwig et al. |
| 2015/0291481 | A1 | 10/2015 | Neff et al. |
| 2015/0299062 | A1 | 10/2015 | McKnight et al. |
| 2016/0075609 | A1 | 3/2016 | Gabrielson et al. |
| 2016/0076062 | A1 | 3/2016 | Medoff et al. |
| 2016/0185682 | A1* | 6/2016 | Katz ............... C05C 11/00 71/28 |
| 2016/0340265 | A1 | 11/2016 | Kanagalingam et al. |
| 2017/0088480 | A1 | 3/2017 | Kannan et al. |
| 2017/0362139 | A1 | 12/2017 | Zhang et al. |
| 2018/0022661 | A1 | 1/2018 | Achille et al. |
| 2018/0208513 | A1 | 7/2018 | Kanagalingam et al. |
| 2018/0208519 | A1 | 7/2018 | Kanagalingam et al. |
| 2018/0297903 | A1 | 10/2018 | Ledoux et al. |
| 2020/0039893 | A1 | 2/2020 | Koripelly et al. |
| 2020/0131098 | A1 | 4/2020 | Hegde et al. |
| 2020/0140353 | A1 | 5/2020 | Hegde et al. |

FOREIGN PATENT DOCUMENTS

| | | |
|---|---|---|
| CA | 2441175 | 3/2004 |
| CA | 2701995 | 10/2011 |
| CN | 1044450 A | 8/1990 |
| CN | 1126465 | 7/1996 |
| CN | 1145059 | 3/1997 |
| CN | 1417172 A | 5/2003 |
| CN | 1666972 | 9/2005 |
| CN | 101108781 | 7/2006 |
| CN | 1298679 | 2/2007 |
| CN | 101037371 | 9/2007 |
| CN | 101134695 | 3/2008 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101384523 | 3/2009 |
| CN | 101486614 | 7/2009 |
| CN | 101628838 | 1/2010 |
| CN | 101638348 | 2/2010 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102503686 | 6/2012 |
| CN | 102557838 | 7/2012 |
| CN | 102746073 | 10/2012 |
| CN | 102826917 | 12/2012 |
| CN | 102951968 | 3/2013 |
| CN | 103319120 | 9/2013 |
| CN | 103588576 | 2/2014 |

(56) References Cited

FOREIGN PATENT DOCUMENTS

| | | |
|---|---|---|
| CN | 103755450 | 4/2014 |
| CN | 103755498 | 4/2014 |
| CN | 103772074 | 5/2014 |
| CN | 103787798 | 5/2014 |
| CN | 103833490 | 6/2014 |
| CN | 103102216 | 12/2014 |
| CN | 104177201 | 12/2014 |
| CN | 104230529 A | 12/2014 |
| CN | 104230575 | 12/2014 |
| CN | 104261723 | 1/2015 |
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| CN | 105669332 | 6/2016 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1043295 | 10/2000 |
| EP | 1067093 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | 348780 | 7/1991 |
| JP | H07-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| SU | 429048 | 5/1974 |
| TW | 1549926 | 9/2016 |
| WO | WO 1989/000079 | 1/1989 |
| WO | WO 1995/026942 | 10/1995 |
| WO | WO 1996/018591 | 6/1996 |
| WO | WO 2003/006399 | 1/2003 |
| WO | WO 2003/045877 | 6/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2013/128402 | 9/2013 |
| WO | WO 2014/189183 | 11/2014 |
| WO | WO 2015/001457 | 1/2015 |
| WO | 2015/114542 A1 * | 8/2015 ............... C05G 3/08 |
| WO | WO 2015/114542 | 8/2015 |
| WO | WO 2015/170217 | 11/2015 |
| WO | WO 2016/091205 | 6/2016 |
| WO | WO 2016/107548 | 7/2016 |
| WO | WO 2016/186526 | 11/2016 |
| WO | WO 2017/013572 | 1/2017 |
| WO | WO 2017/013573 | 1/2017 |
| WO | WO 2017/081183 | 5/2017 |
| WO | WO 2017/087264 | 5/2017 |
| WO | WO 2017/087265 | 5/2017 |
| WO | WO 2017/100507 | 6/2017 |
| WO | WO 2017/137902 | 8/2017 |
| WO | WO 2017/168288 | 10/2017 |
| WO | WO 2018/162533 | 9/2018 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Al-Kanani et al., "Volatilization of ammonia from urea-ammonium nitrate solutions as influenced by organic and inorganic additives." *Fertilizer research* 1990, 23, 113-119.

Allison, "The enigma of soil nitrogen balance sheets," *Adv. Agro.* 1995, 7:213-250.

Al-Zahrani, S.M., "Utilization of Polyethylene and Paraffin Waxes as Controlled delivery Systems for Different Fertilizers" *Ind. Eng. Chem. Res.*, 2000, 39(2):367-371.

Bolan et al., "Soil Acidification and Liming Interactions with Nutrient and Heavy Metal Transformation and Bioavailability," *Advances in Agronomy*, 2003, 78:215-272.

Bose, et al., "New protocol for Biginelli reaction—a practical synthesis of Monastrol," *ARKIVOC*, 2005, 3:228-236.

Chien, et al., "Recent Developments of Fertilizer Production and Use to Improve Nutrient Efficiency and Minimize Environmental Impacts," *Advances in Agronomy*, 2009, 102(8):267-322.

Ciurli, et al. "Structural properties of the nickel ions in; urease: novel insights into the catalytic and inhibition mechanisms," *Coord. Chem. Rev.* 1999, 331:190-192.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N losses from soils fertilized with urea," *Biology and Fertility of Soils*, 2002, 36(2):129-135.

Hays, "Symposium on Controlled Release Fertilizer," *J. Agri. Food*, 1971, 19:797.

International Preliminary Report on Patentability issued in counterpart International Patent Application No. PCT/IB2015/050654, dated Aug. 2, 2016.

International Preliminary Report on Patentability issued in International Patent Application No. PCT/IB2016/054271, dated Oct. 18, 2017.

International Search Report and Written Opinion issued in counterpart International Patent Application No. PCT/IB2015/050654, dated May 19, 2015.

International Search Report and Written Opinion issued in counterpart International Patent Application No. PCT/IB2016/054271, dated Oct. 24, 2016.

International Search Report and Written Opinion issued in counterpart International Application No. PCT/IB2015/053056, dated Sep. 23, 2015.

International Search Report and Written Opinion issued in International Patent Application No. PCT/IB2018/052577, dated Aug. 1, 2018.

International Search Report and Written Opinion issued in International Patent Application No. PCT/IB2018/052578, dated Aug. 1, 2018.

International Search Report and Written Opinion issued in International Patent Application No. PCT/IB2018/052630, dated Aug. 9, 2018.

International Search Report and Written opinion issued in International Application No. PCT/IB2018/055946, dated Dec. 3, 2018.

International Search Report and Written Opinion issued in International Application No. PCT/IB2016/054270, dated Oct. 24, 2016.

International Search Report and Written opinion issued in International Application No. PCT/IB2017/050683, dated Jun. 20, 2017.

(56) References Cited

OTHER PUBLICATIONS

International Search Report and Written Opinion issued in International Patent Application No. PCT/US2016/061486, dated Jan. 25, 2017.
International Search Report and Written Opinion issued in International Patent Application No. PCT/US2016/061487, dated Jan. 5, 2017.
Jarosiewicz & Tomaszewska, "Controlled-release NPK fertilizer encapsulated by polymeric membranes." *Journal of Agricultural and Food Chemistry*, 2003, 51(2):413-417.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1-Diureido Isobutane (IBDU) as a Long-Lasting Nitrogen Fertilizer," *J. Agr. Food Chem.*, 1969, 17(6):1269-1271.
Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.
Mahmood et al., "Effect of rate and application depth matrix-I calcium carbide based formulation on growth, yield and nitrogen uptake of wheat," *African Journal of Agricultural Research*, 2011, 6(30): 6363-6398.
Mahmood et al., "Nutritional and physiological response of wheat to soil applied matrix-I formulated calcium carbide with and without nitro gen fertilizer," *Pakistan Journal of Nutrition* 2012, 11(2): 154-159.
Office Action and Search Report issued in Corresponding Taiwanese Patent Application No. 104114189, dated May 9, 2019.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Chinese Patent Application No. 201680051745.8, dated Jul. 23, 2019.
Office Action issued in corresponding Indian Patent Application No. 201617028561, dated Jun. 18, 2019.
Office Action issued in corresponding Taiwan Patent Application No. 105122936, dated Sep. 5, 2019.
Office Action issued in European Patent Application No. 16741394.7, dated Dec. 7, 2018.
Patra, et al., "Use of urea coated with natural products to inhibit urea hydrolysis and nitrification in soil," *Biol. Fertil. Soils*, 2009, 45:617-621.
Reddy, et al., New environmentally friendly solvent free syntehesis of dihydropyrimidinones catalysed by N-butyl-N, N-dimethylphenylethylammonium bromide, *Tetrahedron Letters*, 2003, 44:8173-8175.
Sanz-Cobena, et al., "Gaseous emissions of N2O and NO and NO3—leaching from urea applied with urease and nitrification inhibitors to a maize (*Zea mays*) crop," *Agriculture, Ecosystems & Environment*, 2012, 149:64-73.
Sinclair et al., "Radiation Use Efficiency," *Advances in Agronomy* 1999, 65: 215-265.
Soares, et al., "Ammonia volatilization losses from surface-applied urea with urease and nitrification inhibitors," *Soil Biology and Biochemistry*, 2012, 52:82-89.
Subbarao, et al., "Scope and Strategies For Regulation of Nitrification in Agricultural Systems—Challenges and Opportunities," *Crit. Rev. Plant Sci.*, 2006, 25-303-335.
Trenkel, "Controlled-release and stabilized fertilizers in agriculture." *International fertilizer industry association* 1997, 11:1-156.
Upadhyay, "Urease inhibitors: A review." *Indian Journal of Biotechnology* 2012, 11:381-388.

Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines For The Use of Fertilizers," *Chinese Agricultural Press*, 2000, 122-123. (English Translation).
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.
Azeem, et al. "Review on materials & methods to produce controlled release coated urea fertilizer," *Journal of Controlled Release*, 2014, 181:11-21.
Babu, et al. "Current Progress on bio-based polymers and their future trends," *Progress in Biomaterials*, 2013, 2:8.
Extended European Search Report issued in counterpart European Patent Application No. 20166713.6, dated Nov. 11, 2020.
Extended European Search Report issued in European Application No. 1686688.7, dated Jun. 13, 2019.
International Search Report and Written Opinion issued in International Patent Application No. PCT/IB2017/050683, dated Jun. 20, 2017.
Lubkowski, "Coating Fertilizer Granules with Biodegradable Materials for Controlled Fertilizer Release," Environmental Engineering and Management Journal, 2014, 13:2573-2581.
Office Action issued in corresponding Chinese Patent Application No. 201680051728.4, dated Aug. 11, 2020.
Office Action issued in counterpart Chinese Patent Application No. 201680051745.8, dated Dec. 2, 2020.
Search Report issued in corresponding Chinese Patent Application No. 201680051745.8, dated Jul. 2, 2019.
Search Report issued in corresponding Chinese Patent Application No. 201680051728.4, dated Aug. 5, 2020.
Yixing, et al. "Application Technology of Novel Slow and Controlled Release Fertilizer," *China Three Gorges Press*, 2008, 1, pp. 90 and 92.
Yongkang, et al. "Modern Drying Technology," *Chemical Industry Press*, 2007, 1:719-722.
Dongpo et al., "Soil biological activities at maize seedling stage under application of slow/controlled release nitrogen fertilizers" *Chinese Journal of Applied Ecology* 2006, 17(6), 1055-1059 (English Translation of conclusion).
Office Action issued in Corresponding Chinese Application No. 201680051728.4, dated Jun. 3, 2021 (No English Translation provided).
Office Action issued in Corresponding Chinese Application No. 201911019580.8, dated Jul. 13, 2021 (English Translation provided).
Office Action issued in Corresponding Chinese Application No. 201880039588.8, dated Jul. 14, 2021 (English Translation provided).
Martin R.J., et al.: Comparison of Agrotain-treated and standard urea on an irrigated dairy pasture, Proceedings of the New Zealand Grassland Association, vol. 70, 2008, Blenheim, pp. 91-94.
Office Action issued in corresponding Chinese Application No. 201680051728.4, dated Oct. 27, 2021.
Office Action issued in corresponding Chinese Application No. 201880040046.2, dated Sep. 1, 2021.
Office Action issued in corresponding Chinese Application No. 202010394499.4, dated Oct. 9, 2021.
Office Action issued in counterpart New Zealand Patent Application No. 723446, dated Nov. 11, 2021.
Zhang J., et al.: Heat Capacity and Thermal Decomposition of Dicyandiamide, Thermochimica Acta, vol. 307, Issue 1, 1997, pp. 11-15, ISSN 0040-6031.
Office Action and Search Report issued in Corresponding Chinese Application No. 201880040397.3, dated Mar. 30, 2022.

* cited by examiner

ENHANCED EFFICIENCY FERTILIZER WITH UREASE INHIBITOR AND NITRIFICATION INHIBITOR IN SEPARATE PARTICLES

CROSS REFERENCE TO RELATED APPLICATIONS

This application is a national phase application under 35 U.S.C. § 371 of International Application No. PCT/IB2018/052630, filed Apr. 16, 2018, which claims the benefit of priority of U.S. Provisional Patent Application No. 62/487,260, filed Apr. 19, 2017, which are hereby incorporated by reference in their entirety.

BACKGROUND OF THE INVENTION

A. Field of the Invention

The invention generally concerns fertilizer compositions that include urease inhibitors and nitrification inhibitors. The urease and nitrification inhibitors are found in separate particles, and the particles can include the inhibitor in a core that is surrounded by a shell of a nitrogen-containing fertilizer composition.

B. Description of Related Art

To increase crop yield and satisfy the growing needs of an increasing population, more fertilizers are being used in agriculture. However, continuous use of fertilizer can lead to nutrient imbalance and loss of soil fertility. In addition, extensive use of urea fertilizer, due to its rapid hydrolysis and nitrification in the soil by soil bacteria, can cause deterioration of soil health and other environmental problems such as greenhouse emissions and groundwater contamination.

Hydrolysis and nitrification of urea in soil can be counteracted by adding urease inhibitors and nitrification inhibitors to the fertilizer. Urease inhibitors reduce the amount of urea hydrolyzed, which reduces the amount of nitrogen lost through ammonia volatilization. Nitrification inhibitors reduce the rate of conversion of ammonium into nitrate, which also reduces the amount of nitrogen lost. Nitrification inhibitors are effective at enhancing efficiency of a variety of nitrogen fertilizers in addition to urea.

While use of urease inhibitors and nitrification inhibitors in fertilizers has been employed as a solution to the problems of urea hydrolysis and nitrification, there are certain difficulties in using these inhibitors. One problem is that some inhibitors are heat sensitive, which complicates the manufacturing process for fertilizers that include such inhibitors. For example, adding a heat-sensitive inhibitor to molten urea before granulation can cause substantial degradation of the inhibitor, as described in *Soil Use & Management*, 24:246 (2008). To compensate for this problem, some fertilizer manufacturers may add an excess of inhibitor to the urea melt, which increases the cost of producing the fertilizer. Another problem is that some combinations of inhibitors can be incompatible if included in the same particle. For example, the inventors of the present application have observed that the nitrification inhibitor dicyandiamide (DCD) can cause stability problems if combined with the urease inhibitor N-(n-butyl) thiophosphoric triamide (NBTPT). Without wishing to be bound by theory, it is commonly known that, under storage conditions, DCD increases the degradation of NBTPT, which is both thermal as well as moisture sensitive.

SUMMARY OF THE INVENTION

A solution to the aforementioned problems is disclosed below. In some embodiments, the solution resides in providing a particulate fertilizer composition with two types of particles, each having a core-shell structure: one type of particles has a nitrification inhibitor in the core and another type of particles has a urease inhibitor in the core. This provides for a fertilizer composition in which the nitrification inhibitor and urease inhibitor are physically separated from each other, thus preventing any degradation effects that the inhibitors can have on each other and avoiding other issues with incompatible pairs of inhibitors. The manufacturing process of the fertilizer composition provides protection against heat degradation for the inhibitors that are included in the core particles. This is accomplished by adding an inhibitor, for example DCD or NBTPT, to the core particle instead of to a relatively hot composition, such as molten urea, during the process of making the fertilizer particles. The other ingredients in the core particle help provide a buffer against heat during the manufacturing process, reducing the amount of inhibitor lost to heat degradation. In addition, the manufacturing process of the fertilizer compositions disclosed herein can be simplified in that it is not necessary to make particles having both a nitrification inhibitor and a urease inhibitor in the same particle. Instead, separate core particles, each including a different inhibitor, can be prepared separately and then can be fattened with a nitrogen fertilizer-containing shell following the same procedure.

Disclosed herein is a particulate fertilizer composition that can include (a) a first particle that can include a first core particle and a first shell, wherein the first core particle can include a urease inhibitor and is substantially free of any nitrification inhibitors; and (b) a second particle that can contain a second core particle and a second shell, wherein the second core particle can contain a nitrification inhibitor and is substantially free of any urease inhibitor. The shells of each of the first particle and second particle can contain a nitrogen-containing fertilizer composition such as, for example, urea. The urease inhibitor in the first core particle can contain a variety of inhibitors known in the art including, for example, N-(n-butyl) thiophosphoric triamide (NBTPT). The nitrification inhibitor in the second core particle can contain a variety of inhibitors known in the art including, for example, dicyandiamide (DCD). This particulate fertilizer composition provides the advantage of keeping the nitrification and urease inhibitors in separate particles, thus mitigating incompatibilities between the inhibitors, such as the negative effect of DCD on NBTPT stability.

The shell of the second particle (the "second shell") can further contain a nitrification inhibitor. In such embodiments, both the second core particle and the second shell can contain a nitrification inhibitor. Nitrification inhibitors, such as DCD, are particularly suited to being included in a shell composition in addition to, or instead of, in a core particle because during the manufacturing process they can be added to a molten fertilizer composition, such as molten urea, without suffering the same thermal degradation effects as some urease inhibitors, such as, for example, NBTPT.

The nitrification and urease inhibitors can be present in a range of amounts. In some embodiments, the urease inhibitor is present in the first core particle in an amount between 1 and 5 wt % of the first core particle. The urease inhibitor can also be about 0.1, 0.5, 1.0, 1.5, 2.0, 2.5, 3.0, 3.5, 4.0, 4.5, 5.0, 6.0, 7.0, 8.0, 9.0, 10.0 wt % of the core particle or between any two of those values. In some embodiments, the nitrification inhibitor is present in the second core particle in an amount between about 10 and 50 wt % of the second core particle. The nitrification inhibitor can also be about 0.1, 0.5, 0.6, 0.7, 0.8, 0.9, 1.0, 1.1, 1.2, 1.3, 1.4, 1.5, 1.6, 1.7, 1.8, 1.9, 2.0, 3, 4, 5, 6, 7, 8, 9, 10, 15, 20, 25, 30, 35, 40, 45, 50, 55, or 60 wt % of the second core particle or between any two of those values. In embodiments in which the nitrification inhibitor is also included in the second shell, the nitrification inhibitor can also be about 0.1, 0.5, 0.6, 0.7, 0.8, 0.9, 1.0, 1.1, 1.2, 1.3, 1.4, 1.5, 1.6, 1.7, 1.8, 1.9, 2.0, 3, 4, 5, 6, 7, 8, 9, 10, 15, 20, 25, 30, 35, 40, 45, 50, 55, or 60 wt % of the shell.

The amounts of nitrification and urease inhibitors included in the respective particles can be chosen such that the amounts in the particulate fertilizer composition as a whole are effective to stabilize nitrogen in the soil to which the particulate fertilizer composition is applied. That is, if the particulate fertilizer composition contains equal amounts of first and second particles, the amounts of inhibitors in the respective particles would be double the amount that would normally be used in a composition that included only one type of particle. For example, in such a composition having equal amounts of first and second particles, if the desired final amount of urease inhibitor in a particulate fertilizer composition as a whole was 0.1 wt %, the amount of urease inhibitor in the first particles would be 0.2 wt % of the first particle (the amount as a percentage of the first core particle would be higher than this, given that the first core particle is only a portion of the first particle). The same would apply with regard to the amounts of nitrification inhibitors.

In some embodiments, the first core particle and second core particle can contain substances in addition to the urease inhibitor and the binder, such as a filler, a pH balancing agent, and a polymer thickener. The first core particles and second core particles can have different amounts of these additional ingredients as needed to accommodate differing amounts of inhibitor and to provide different desired properties.

A binder in the first core particle and/or second core particle can help to keep the core particle from breaking or crumbling during the manufacturing process or storage. In some embodiments, the binder can be one or more of plaster of Paris, flour, biodegradable bleached wheat flour, starch, gluten, kaolin, bentonite, or colloidal silica, including mixtures thereof. Other suitable binders known in the art can also be used. In some embodiments, the binder is present in the core particle in an amount between 10 and 99 wt % of the core particle. In some embodiments, the binder is present in the core particle in an amount of about 10, 15, 20, 25, 30, 35, 40, 45, 50, 55, 60, 65, 70, 75, 80, 85, 90, 95, 98, or 99 wt % of the core particle or between any two of those values.

In some embodiments, the filler in the first core particle and/or second core particle can contain one or more of silica, dried distillers grains with solubles (DDGS), or rice husk, or mixtures thereof. Other suitable fillers known in the art can also be used. In some embodiments, the filler is present in the core particle in an amount between greater than 0 and 60 wt % of the core particle. In some embodiments, the filler is present in the core particle in an amount of about 1, 5, 10, 15, 20, 25, 30, 35, 40, 45, 50, 55, or 60 wt % of the core particle or between any two of those values.

In some embodiments, the pH buffering agent in the first core particle and/or second core particle can be one or more of chalk powder, $CaCO_3$, $Na_2CO_3$, $K_2CO_3$, $MgO$, $KH_2PO_4$, $NaHCO_3$, or $MgCO_3$ or mixtures thereof. In some embodiments, the filler is present in the core particle in an amount between about 5 and 60 wt % of the core particle. In some embodiments, the filler is present in the core particle in an amount of about 5, 10, 15, 20, 25, 30, 35, 40, 45, 50, 55, or 60 wt % of the core particle or between any two of those values. In some embodiments, a pH buffering agent can also function as a filler. For example, in some embodiments, $CaCO_3$ is used as both the filler and as the pH buffering agent, and no other fillers or pH buffering agents are included in the core particle.

In some embodiments, the polymer thickener in the first core particle and/or second core particle can be one or more of hydroxypropyl methylcellulose, carboxymethylcellulose, hydroxyethylcellulose, polyethylene glycol (PEG), guar gum, locust bean gum, xanthan gum, other natural gums, or synthetic polymers based on acrylates, polyacrylamide (PAM), PVP, or combinations of synthetic polymers and carbomers. In some embodiments, the polymer thickener is present in an amount between 0.1 and 1 wt % of the core particle. In some embodiments, the polymer thickener is present in an amount of about 0.1, 0.2, 0.3, 0.4, 0.5, 0.6, 0.7, 0.8, 0.9, or 10 wt % of the core particle or between any two of those values.

The particulate fertilizer composition can contain a plurality of first particles and a plurality of second particles, in varying proportions. For example, the weight ratio of first particles to second particles can be approximately 1:1. The weight ratio of first particles to second particles can also be approximately 1:5, 2:5, 3:5, 4:5, 1:1, 5:4, 5:3, 5:2, or 5:1, or between any two of these values. The relative amounts of inhibitors in the first and second particles can be adjusted based on the weight ratio of the particles. For example, if the weight ratio of first particles to second particles were 1:5, the amount of urease inhibitor in the first particles can be 5×, or five times the desired final concentration ("1×") in the fertilizer composition as a whole.

In some embodiments, the first core particle can contain the following ingredients in the indicated amounts, with the amounts being given as the percent of the ingredient by weight in relation to the core particle: 10 to 94 wt % binder, 0 to 60 wt % filler, 5 to 60 wt % pH balancing agent, and 1 to 5 wt % NBTPT. In some embodiments, the second core particle can contain the following ingredients in the indicated amounts, with the amounts being given as the percent of the ingredient by weight in relation to the core particle: 10 to 85 wt % binder, 0 to 50 wt % filler, 5 to 60 wt % pH balancing agent, and 10 to 50 wt % DCD.

Embodiments of the particles disclosed herein can include a variety of different arrangements and proportions of the core particles and the shells. For all disclosed dimensions, the first particle and second particle can have the same or different measurements. In some embodiments, there are multiple core particles in a single fertilizer particle. In some embodiments, the diameter of the first core particle and/or second core particle is between about 0.5 and 2 mm. In some embodiments, the diameter of the core particle is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 3.0, 4.0, or 5.0 mm or is between any two of those values. In some embodiments, the thickness of the first shell and/or second shell is between about 1 and 6 mm. In some embodiments, the thickness of the shell is about 0.5, 0.6, 0.7, 0.8, 0.9, 1.0, 1.1, 1.2, 1.3, 1.4, 1.5, 1.6, 1.7, 1.8, 1.9, 2.0, 3.0, 4.0, 5.0, or 6.0 mm or is between any two of those values. In some embodiments, the shell is a solid nitrogen fertilizer-containing composition that has been formed by spraying the nitrogen fertilizer-containing composition in molten form onto the core particle and allowing the molten nitrogen fertilizer-containing composition to cool and solidify. In some embodiments, the molten nitrogen fertilizer-containing composition is a molten urea-containing composition. In some embodiments, the weight ratio of the first shell or second shell to the first core particle or second core particle is about 2:1, 3:1, 4:1, 5:1, 10:1, 15:1, 20:1, 30:1, 40:1, or 50:1 or is between any two of those values. In some embodiments, the first shell and/or second shell makes up about 70, 80, 90, 95, or 99% of the weight of the first fertilizer particle and or second fertilizer particle or between any two of those values. In some embodiments, the first particle and/or second particle—including both the core particle and shell—has a diameter of between 0.5 and 8 mm. In some embodiments, the fertilizer particle has a diameter of about 0.2, 0.5, 1.0, 1.5, 2.0, 2.5, 3.0, 3.5, 4.0, 4.5, 5.0, 6.0, 7.0, 8.0, 9.0, or 10.0 mm or between any two of those values. In some embodiments, the core particle is an extruded particle. In some embodiments, the first shell and/or second shell substantially or fully surrounds first core particle and/or the second core particle. In some embodiments, the shell covers at least 90, 95, or 99% of the surface of the core particle. In embodiments in which the shell fully surrounds the core particle, the shell covers 100% of the surface of the core particle.

Embodiments of the particulate fertilizer compositions disclosed herein can be characterized by the stability of the nitrogen in the particles when exposed to soils. Because of the efficient distribution of urease inhibitors and nitrification inhibitors in separate particles, the particulate fertilizer compositions described herein suffer less loss of nitrogen due to hydrolysis and nitrification than would otherwise occur. In some embodiments, less than 20 wt % of the nitrogen in the particulate fertilizer composition is lost via ammonia volatilization after being exposed to Greenville soil for 20 days. In some embodiments, the amount of nitrogen in the particulate fertilizer composition lost via ammonia volatilization after being exposed to Greenville soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values. In some embodiments, less than 20 wt % of the nitrogen in the particulate fertilizer composition is lost after being exposed to Crowley soil for 20 days. In some embodiments, the amount of nitrogen in the particulate fertilizer composition lost after being exposed to Crowley soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values.

Also disclosed is a particulate fertilizer composition that can include at least two of the following types of particles: (a) a plurality of first particles, each first particle can include (i) a first core particle that can includes a urease inhibitor and a binder and (ii) a urea-containing fertilizer composition in contact with the outer surface of the first core particle; (b) a plurality of second particles, each second particle can contain (i) a second core particle that can include a nitrification inhibitor and a binder and (ii) a urea-containing fertilizer composition in contact with the outer surface of the second core particle; and (c) a plurality of third particles, each third particle can contain a urea-containing fertilizer and not contain a core particle. In some embodiments, each of the first particles are substantially free of any nitrification inhibitor, each of the second particles are substantially free of any urease inhibitor, and each of the third particles are substantially free of any nitrification inhibitor or urease inhibitor. In some embodiments, each of the third particles can further contain a nitrification inhibitor. In some embodiments, the urea-containing fertilizer composition in contact with the outer surface of the second core particle can further contain DCD. This particulate fertilizer composition provides flexibility in making a particulate fertilizer composition with the desired final concentrations of inhibitors. For example, if a particulate fertilizer composition contains a 1× concentration of urease inhibitor and no nitrification inhibitor, first particles with a 2× concentration of urease inhibitor can be combined with third particles containing no inhibitor of any kind in a weight ratio of approximately 1:1. That would eliminate the need for producing first core particles having varying concentrations of urease inhibitor, allowing the final concentration of urease inhibitor in the final particulate fertilizer composition to be adjusted by adding an appropriate amount of third particles having no inhibitor. The same would be true for producing particulate fertilizer compositions having a desired amount of nitrification inhibitors. In addition, a particulate fertilizer composition could include first particles with a 2× concentration of urease inhibitor mixed with an approximately equal amount of third particles with a 2× concentration of nitrification inhibitor to result in a particulate fertilizer composition having a 1× concentration of both inhibitors. This would eliminate the need to produce core-shell particles having nitrification inhibitors, which can simplify the manufacturing process since some nitrification inhibitors, including DCD, are relatively heat-stable and can be added directly to molten urea during the manufacturing process rather than having to be protected within a core particle. Thus, a variety of combinations of mixtures of the particles can be created. For example, the particulate fertilizer composition can include a plurality of the first particles and a plurality of the second particles in a weight ratio of approximately 1:1, without including any third particles. As another example, the particulate fertilizer composition can include a plurality of the third particles and either a plurality of the first particles or a plurality of the second particles, with a weight ratio of first particles to second particles or third particles of approximately 1:1. In some embodiments, the plurality of third particles has an average diameter of at least about 0.1, 0.2, 0.3, 0.4, or 0.5 mm.

Also disclosed is a method of enhancing plant growth by applying to soil an effective amount of a composition containing any of the particulate fertilizer compositions described herein.

Also disclosed are the following Embodiments 1 to 20 of the present invention. Embodiment 1 is a particulate fertilizer composition comprising: (a) a first particle comprising a first core particle and a first shell, wherein the first core particle comprises a urease inhibitor and is substantially free of any nitrification inhibitor; and (b) a second particle comprising a second core particle and a second shell, wherein the second core particle comprises a nitrification inhibitor and is substantially free of any urease inhibitor. Embodiment 2 is the particulate fertilizer composition of Embodiment 1, wherein the first shell and the second shell comprise a nitrogen-containing fertilizer composition. Embodiment 3 is the particulate fertilizer composition of Embodiment 1 or 2, wherein the second shell further comprises a nitrification inhibitor. Embodiment 4 is the particulate fertilizer composition of any one of Embodiments 1 to 3, wherein the urease inhibitor comprises N-(n-butyl) thiophosphoric triamide (NBTPT) and the nitrification inhibitor comprises dicyandiamide (DCD). Embodiment 5 is the particulate fertilizer composition of any one of Embodiments 1 to 4, wherein the first core particle comprises NBTPT and the NBTPT is between 1 and 5 wt % of the first core particle and the second core particle comprises DCD and the DCD is between 10 and 50 wt % of the second core particle. Embodiment 6 is the particulate fertilizer composition of any one of Embodiments 1 to 5, wherein the first core particle and the second core particle further comprise a binder comprising one or more of plaster of Paris, flour, biodegradable bleached wheat flour, starch, colloidal silica, kaolin, bentonite, or gluten. Embodiment 7 is the particulate fertilizer composition of any one of Embodiments 1 to 6, wherein the first core particle and the second core particle further comprise a filler comprising one or more of silica, dried distillers grains with solubles (DDGS), or rice husk. Embodiment 8 is the particulate fertilizer composition of any one of Embodiments 1 to 7, wherein the first core particle and the second core particle further comprise a pH buffering agent comprising one or more of chalk powder, $CaCO_3$, $MgO$, $KH_2PO_4$, $NaHCO_3$, $Na_2CO_3$, or $K_2CO_3$. Embodiment 9 is the particulate fertilizer composition of any one of Embodiments 1 to 8, wherein the particulate fertilizer composition comprises a plurality of first particles and a plurality of second particles, and wherein the weight ratio of the first particles to the second particles is approximately 1:1. Embodiment 10 is the particulate fertilizer composition of any one of Embodiments 1 to 9, wherein the first core particle comprises 10 to 94 wt % binder, 0 to 60 wt % filler, 5 to 60 wt % pH balancing agent, and 1 to 5 wt % NBTPT, and wherein the second core particle comprises 10 to 85 wt % binder, 0 to 50 wt % filler, 5 to 60 wt % pH balancing agent, and 10 to 50 wt % DCD. Embodiment 11 is the particulate fertilizer composition of any one of Embodiments 1 to 10, wherein the weight ratio of the first shell to the first core particle and of the second shell to the second core particle is between about 40:1 and 5:1. Embodiment 12 is the particulate fertilizer composition of any one of Embodiments 1 to 11, wherein the first core particle and second core particle are between about 0.5 and 2 mm in diameter and wherein the first particle and the second particle are between about 1 and 8 mm in diameter. Embodiment 13 is the particulate fertilizer composition of any one of Embodiments 1 to 12, wherein the particulate fertilizer composition comprises nitrogen and less than 20 wt % of the nitrogen in the particulate fertilizer composition is lost via ammonia volatilization after being exposed to Greenville soil or Crowley soil for 20 days. Embodiment 14 is a particulate fertilizer composition comprising at least two of the following groups of particles: (a) a plurality of first particles, each first particle comprising: (i) a first core particle comprising NBTPT and a binder; and (ii) a urea-containing fertilizer composition in contact with the outer surface of the first core particle; and (b) a plurality of second particles, each second particle comprising: (i) a second core particle comprising DCD and a binder; and (ii) a urea-containing fertilizer composition in contact with the outer surface of the second core particle; and (c) a plurality of third particles, each third particle comprising a urea-containing fertilizer and not comprising a core particle. Embodiment 15 is the particulate fertilizer composition of Embodiment 14, wherein each of the first particles are substantially free of any nitrification inhibitor, each of the second particles are substantially free of any urease inhibitor, and each of the third particles are substantially free of any nitrification inhibitor or urease inhibitor. Embodiment 16 is the particulate fertilizer composition of Embodiment 14, wherein each of the third particles further comprise a nitrification inhibitor. Embodiment 17 is the particulate fertilizer composition of any one of Embodiments 14 to 16, wherein the urea-containing fertilizer composition in contact with the outer surface of the second core particle further comprises DCD. Embodiment 18 is the particulate fertilizer composition of any one of Embodiments 14 to 17, wherein the third particle has a diameter of at least 0.5 mm. Embodiment 19 is the particulate fertilizer composition of any one of Embodiments 14 to 18, wherein the particulate fertilizer composition comprises a plurality of the first particles and a plurality of the second particles, wherein the particulate fertilizer does not comprise the third particle, and wherein the weight ratio of the first particles to the second particles is approximately 1:1. Embodiment 20 is the particulate fertilizer composition of any one of Embodiments 14 to 17, wherein the particulate fertilizer composition comprises a plurality of the third particles and either a plurality of the first particles or a plurality of the second particles, and wherein the weight ratio of the third particles to the first particles or the second particles is approximately 1:1.

The terms "about" or "approximately" as used herein are defined as being close to as understood by one of ordinary skill in the art. In one non-limiting embodiment, the terms are defined to be within 10%, preferably within 5%, more preferably within 1%, and most preferably within 0.5%.

The terms "wt %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, can mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fertilizer compositions of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the fertilizer particles compositions of the present invention are their abilities to inhibit degradation of the components contained therein.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments can be combined with features from other embodiments. For example, features from one embodiment can be combined with features from any of the other embodiments. In further embodiments, additional features can be added to the specific embodiments described herein.

BRIEF DESCRIPTION OF THE DRAWINGS

Advantages of the present invention can become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

FIG. 1A shows a cross section of a core-shell fertilizer particle. FIG. 1B shows a cross section of a homogeneous fertilizer particle.

DETAILED DESCRIPTION OF THE INVENTION

Particulate fertilizer compositions described herein are a mixture of at least two different types of fertilizer particles. Some of the fertilizer particles described herein can contain two discrete portions: a core particle and a shell of a nitrogen-based fertilizer composition. Other fertilizer particles are homogeneous, containing a single matrix of a nitrogen-based fertilizer composition with, in some embodiments, additional ingredients like nitrification inhibitors distributed throughout that matrix. These and other non-limiting aspects of the present invention are discussed in further detail in the following sections.

A. Fertilizer Particle

Figure 1A:
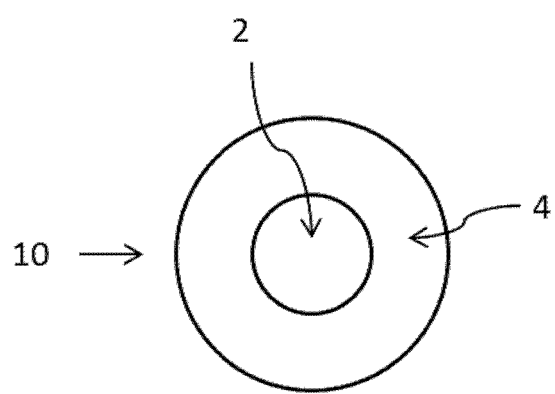
FIGS. 1A and 1B illustrate cross sections of fertilizer particles.

An illustrative cross section view of an embodiment of a core-shell fertilizer particle for use in the particulate fertilizer compositions of the invention is depicted in FIG. 1A. In the illustrated embodiment, the fertilizer particle 10 can contain a core particle 2 and a shell 4. The core particle 2 has a circular cross-section, although other shapes can readily be made. The core particle 2 can contain a nitrification inhibitor or urease inhibitor and additional ingredients including, for example, a binder. The core particle 2 can also contain a filler, a pH balancing agent, and/or a polymer thickener. In the illustrated embodiment, a shell 4 surrounding the core particle 2 is made from a solid urea-containing composition. It is particularly advantageous to have the urease inhibitor NBTPT in the core particle 2, as this can protect that NBTPT from thermal degradation during the granulation process. It will be apparent to persons of ordinary skill in the art that a variety of configurations of the fertilizer particle 10 are possible. For example, a particle can be made that has nitrification inhibitor in both the core particle 2 and in the shell 4.

Figure 1B:
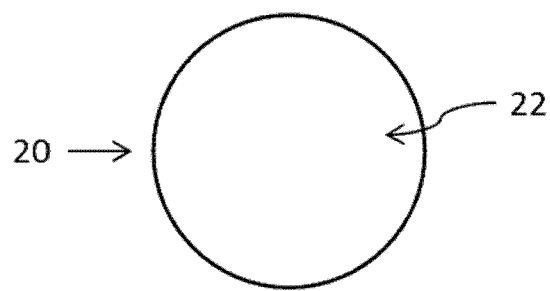

An illustrative cross section view of an embodiment of a homogeneous fertilizer particle is depicted in FIG. 1B. The homogeneous fertilizer particle 20 can contain a matrix 22 of a nitrogen fertilizer-containing composition, such as solid urea. The homogeneous fertilizer particle 20 can also contain an inhibitor, such as DCD, and other suitable ingredients such as binders, pH balancing agents, and/or fillers distributed within the matrix 22.

Particulate fertilizer compositions can include combinations of different types of core-shell particles. For example, a particulate fertilizer composition can include a mixture of particles that have NBTPT in the core particle and particles that have DCD in the core particle. Either of these types of particles can be mixed with homogeneous fertilizer particles that contain no inhibitor.

While the fertilizer particles illustrated in FIGS. 1A and 1B have circular cross-sections, a variety of shapes are possible. For example, the fertilizer particle can have a spherical, puck, oval, or oblong shape. The fertilizer particles can also have a variety of sizes. In some embodiments, the fertilizer particle has a longest dimension between about 1 and 8 mm.

Binders to be used in the fertilizer particle can be chosen for their suitability to extrusion processes for making core particles. In some instances, the binders are receptive to a solvent, such as, for example, water. "Receptive to solvents" in this context means that the solvents will affect the binding properties of the binder. Accordingly, as described herein, an appropriate solvent will affect the binding properties of a particular binder, as well as other binders, fillers, and excipients in the formulation.

Core particles and fertilizer particles disclosed herein have desirable physical properties such as desired levels of abrasion resistance, particle strength, pelletizability, hygroscopicity, particle shape, and size distribution, which are important properties for the fertilizer core particle. Accordingly, the binder can be chosen to optimize these properties.

A particular application of embodiments disclosed herein is the stabilization of an inhibitor, such as, for example, NBTPT present in the core particle and of other fertilizer additives. Certain fertilizer additives are unstable and tend to degrade upon exposure to high temperatures, changes in pH (either acidic or basic), etc. In particular instances, fertilizer core particles disclosed herein are embedded within or coated with a fertilizer composition such as, for example, urea. In some instances, a shell that can contain urea substantially surrounds at least a portion of the outer surface of the core particle.

In conventional fertilizer technology, various fertilizer additives are mixed with a fertilizer using an "all in one" methodology. In these instances, fertilizers, fertilizer additives, excipients, and other ingredients are mixed together to form a fertilizer composition in the form of particles or granules. In most cases, granulation is performed at elevated temperatures such that the fertilizer composition is at a molten state. For example, the granulation temperature for molten urea is about 135° C. at about 35 atm pressure. Many fertilizer additives degrade, at least partially, under these conditions. Traditionally, these stability problems have been circumvented by using a large excess of fertilizer additives. Such methods, although in use, are sub-optimal and raise concerns regarding cost, efficacy, by-products, environmental waste, and green-house gases, etc.

The production of core particles disclosed herein provides a solution to the instability of some fertilizer additives at higher temperatures. The binder, pH stabilizing agent and/or filler can be chosen such that the resulting composition synergistically protects the fertilizer additives from high temperature degradation. As disclosed herein, the binder, pH stabilizing agent, filler, and polymer thickener can be mixed together with the fertilizer additive and extruded to form a core particle.

In some embodiments, no nitrogen fertilizer composition is present in the core particle. Thus, in such instances, only the fertilizer additive, such as a urease inhibitor or nitrification inhibitor (together with the binder, pH buffering agent, and/or filler) is present in within the core particle.

Some of the fertilizer additives are unstable towards changes in pH, either in the composition during the manufacturing process, or after application to the soil. For example, in the case of nitrogen containing fertilizers, after application, the soil environment becomes acidic. Accordingly, fertilizer additives that are sensitive to the acidic pH degrade and will not reach their full performance capability. Including a large excess of fertilizer additives to compensate for the loss due to pH variations may not be successful, since the fertilizers, which are present in a large excess (in comparison to the fertilizer additives), continue to alter the pH of the soil environment. Also, some commercial products, such as SUPERU®, use organic solvents like NMP for adding fertilizer additives to the fertilizer composition. Such use is undesired and is avoided in the production of certain embodiments of the fertilizer particles described herein.

In some embodiments disclosed herein, the core particle is embedded within a nitrogen fertilizer-containing composition, including a urea-containing composition. For example, in some embodiments, a shell containing a fertilizer composition at least partially surrounds the outer surface of the fertilizer core particle. In some of these embodiments, the shell can contain a nitrogen containing fertilizer composition, such as urea. In some instances, two or more core particles can be embedded within a urea matrix.

B. Urease Inhibitors and Nitrification Inhibitors

Urea is one of the most widely used fertilizers because of its high nitrogen content (46.6%). A number of urease and nitrification inhibitors have been developed to enhance the efficiency of urea fertilizer, but their application can be challenging due to stability problems in the soil under various conditions such as pH, temperature, precipitation, etc. For example, NBTPT is known to be a good inhibitor of urease but it is unstable under acidic pH. NBTPT also decomposes when exposed to high temperatures, such as the temperature of a urea melt (about 135-140° C.).

To overcome these issues, embodiments of the fertilizer particle are provided that contain a core particle that is coated with an outer coating of urea that will first come in contact with the soil, protecting the active ingredients in the core particle, which will get released gradually. The fertilizer core particle can contain both a binder and a pH buffering agent. The pH buffering agent, for example $CaCO_3$, which can be provided in the form of chalk powder, is a material that can neutralize the acidity caused by urea hydrolysis, thereby preventing active agents, such as, for example, NBTPT, from degrading when placed in soil with an acidic pH. Thus, the pH buffering agent can increase the efficacy of active agents, such as, for example, NBTPT, and also maintains soil pH. The fertilizer particles also have the advantage of keeping a urease inhibitor and a nitrification inhibitor in separate areas of the fertilizer particle, which prevents any degradation or other detrimental effects from combining different inhibitors.

The binder in the fertilizer core particle protects the active ingredient, for example NBTPT, from being exposed to high temperatures during the granulation process, thereby preventing NBTPT from decomposing in the granulation process. For example, plaster of Paris (PoP)-containing cores can prevent NBTPT degradation efficiently during the granulation process. In such a formulation, all active ingredients are protected inside the core by the PoP.

Additional inhibitors besides NBTPT and DCD can be included in the fertilizer particles described herein, including without limitation, 3,4-dimethylpyrazole phosphate (DMPP), thio-urea (TU), phenyl phosphorodiamidate (PPDA), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercapto-benzothiazole (MBT), or 2-Sulfanimalamidothiazole (ST), or combinations thereof.

Additional fertilizer substances besides urea can be included in the fertilizer particles. Additional fertilizers can be chosen based on the particular needs of certain types of soil, climate, or other growing conditions to maximize the efficacy of the fertilizer particle in enhancing plant growth and crop yield. Additional additives can also be included in the fertilizer particles, including without limitation micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients can include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients can include lime, gypsum, superphosphate, or a combination thereof.

C. Binders

The fertilizer particles described herein can contain a binder, which is a material that is used to bind together components in a mixture through adhesive and/or cohesive forces. The core particle can contain from 10 to 99 wt % of binder. The amount and type of binder can be chosen based on the desired final properties of the core particle. The binder can be selected so that an extrusion process can be used during the production of the core particle. It is understood that for some binders, such as plaster of Paris and bleached wheat flour, an amount of water (moisture) is needed to make the core extrudable. Any free moisture content present in the core material during the extrusion process is typically removed post-extrusion. However, residual amounts of free moisture content, typically below 4 wt %, such as, for example, below 0.5 wt %, can be present in the core particle.

In one aspect, the binder can contain a phosphate, a polyphosphate, a biodegradable polymer, or a wax, or a combination thereof. Suitable waxes can include, but are not limited to, vegetable waxes, high melt waxes, ethylene bis(stearamide) wax, paraffin waxes, polyethylene based waxes, and olefin waxes. Suitable phosphates can include, but are not limited to, diammonium phosphate, and monoammonium phosphate. Suitable polyphosphates can include, but are not limited to, ammonium polyphosphate. Suitable biodegradable polymers can include, but are not limited to, polyacrylamide, polyacrylic acid, polyacrylonitrile, biodegradable polylactic acid and other biodegradable polymeric material such as polylactic acid, poly(3-hydroxypropionic acid), polyvinyl alcohol, poly e-caprolactone, poly L-lactide, polybutylene succinate, and biodegradable starch based polymers.

In another aspect, the binder can contain plaster of Paris, flour, starch, gluten, kaolin, bentonite, colloidal silica, or combinations thereof. Suitable flours can include, but are not limited to, rice flour, wheat flour, and bleached wheat flour. Suitable starches can include, but are not limited to, dextrin modified starches.

D. pH Buffering Agents

The core particle can also contain one or more pH buffering agents to help counteract the tendency of urea fertilizer to acidify the soil. Examples of suitable pH buffering agents can include, but are not limited to, $CaCO_3$, $MgO$, $KH_2PO_4$, $NaHCO_3$, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, and combinations thereof.

E. Fillers

The core particles in the fertilizer particles can contain a filler, which is a material that can improve the physical properties of the core particle, such as crush strength, homogeneity, and extrusion properties, or alter the release kinetics of inhibitors or micronutrients from the core particle. A filler in combination with a binder can be selected to enhance physical and release properties of the core particle. The filler can contain, for example, silica, dried distillers grains with solubles (DDGS), rice husk or other biomaterial, or a combination thereof.

F. Nitrogen Fertilizer-Containing Composition

In one aspect, the fertilizer particle can contain an outer layer, or shell, containing a nitrogen fertilizer, such as urea or a combination of urea with other nitrogen fertilizers. Suitable other nitrogen fertilizers can include, but are not limited to, ammonium nitrate, ammonium sulfate, DAP, MAP, urea-formaldehyde, ammonium chloride, and potassium nitrate. A urea-containing shell can be fattened onto the core particle by spraying molten urea onto the core particle in a granulation process.

G. Compositions

The particulate fertilizer compositions described herein can themselves be used for application to soil or can be mixed with other components in a composition useful for application to soil. In addition to the fertilizer particles, the composition can include other fertilizer compounds, micronutrients, primary nutrients, secondary nutrients, insecticides, herbicides, fungicides, and combinations thereof.

The particulate fertilizer compositions described herein can also be included in a blended composition containing other fertilizer granules. The other fertilizer granules can be granules of urea, Single Super Phosphate (SSP), Triple Super Phosphate (TSP), ammonium sulfate and the like.

H. Method of Making Fertilizer Particles and Particulate Fertilizer Compositions In some embodiments, core particles used in the core-shell particles are made by extruding a composition containing a urease inhibitor, a binder, and, optionally, other suitable substances such as fillers, pH balancing agents, or other additives. The composition can be formed by mixing the ingredients in dry form, adding any solvent, if needed, and further mixing to make an extrudable composition. A solvent, such as water, may be needed to make an extrudable composition if the binder is plaster of Paris, flour, starch, or gluten, but may not be needed if the binder contains a wax. The extrusion can be done using suitable extruder apparatus known in the art and can be performed at a temperature between 0° C. and 150° C. and a screw speed from 1 to 500 rpm, wherein the extruder can contain a multi-feeder containing extrusion components that can include a main drive, shaft, screw, barrel, and/or die. In some embodiments, the binder can be plaster of Paris, and the extrusion is performed at a temperature between about 15° C. and 50° C. In some embodiments, the extrusion method can include slicing the extrudate, forming a core particle having a cylindrical shape and having both a diameter and a length between about 0.5 and 2.0 mm. The method can also include a drying step to remove solvent that may have been added to make the composition extrudable. The cylindrical core particle can be spheronized, producing a core particle having a substantially spherical shape.

The core particle can be fattened with a shell containing a urea-containing composition, thereby forming a fertilizer particle. The fattening process can include spraying a molten urea-containing composition onto the core particle, for example, in a granulation apparatus known in the art. As the molten urea-containing composition is sprayed onto the core particle, it cools and solidifies, resulting in a fertilizer particle. The resulting fertilizer particle can be of various sizes. In some embodiments, the fertilizer particle has a size between about 1 and 8 mm.

Figure 2:
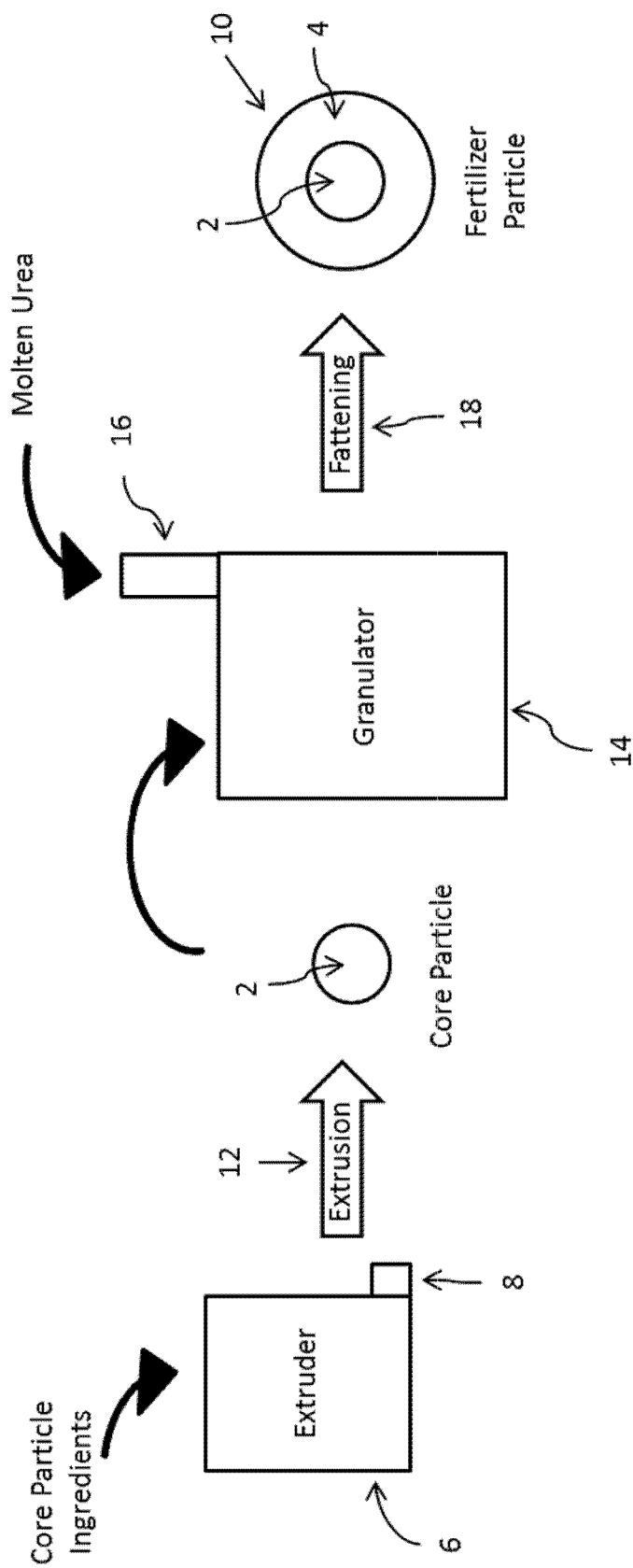
FIG. 2 depicts an embodiment of a process by which a core-shell fertilizer particle is produced.

FIG. 2 illustrates an embodiment of a process by which a fertilizer particle 10 can be produced. To make the core particle 2, the core particle ingredients, which can include a binder, filler, pH balancing agent, polymer thickener, and a urease inhibitor or nitrification inhibitor, among other suitable ingredients, are placed into the hopper of an extruder 6. The extruder 6 pushes the mixed core particle ingredients through a die 8 in the process of extrusion 12. During extrusion 12, a cutting implement (not shown) associated with the die 8 cuts the extrudate into pieces, resulting in core particles 2 (not drawn to scale), which can be further processed (not shown) to be dried, if needed, and made spherical. The core particles are then added to a granulator 14. Molten urea, which can also include DCD, is delivered into the granulator apparatus through a pipe 16. Within the granulator 14, the molten urea is sprayed onto the surface of the core particles 2, where it cools and solidifies in a process known as fattening 18. After fattening 18, the fertilizer particle 10 has both a core particle 2 and a solid urea-containing shell.

Particulate fertilizer compositions including two types of core-shell particles can be made in a variety of ways. In one way, a core-shell particle containing a urease inhibitor in the core particle can be made and, separately, a core-shell particle containing a nitrification inhibitor in the core particle can be made, and then the different types of core-shell particles are mixed in the desired proportion to make a particulate fertilizer composition containing both types of core-shell particles. Another way of making such a composition would be to separately prepare core particles having a urease inhibitor and core particles having a nitrification inhibitor. The core particles can then be mixed together in the desired proportions before being added to the granulator and fattened. The result would be a mixture of core-shell particles with urease inhibitor in the core and core-shell particles with nitrification inhibitor in the core.

Homogeneous fertilizer particles to be included in the particulate fertilizer compositions described herein can be made according to conventional granulation or prilling techniques. In the case of homogeneous fertilizer particles that include DCD, the DCD can be added in the desired amounts to the molten urea composition before granulation.

I. Methods of Using Fertilizer Particles

The particulate fertilizer compositions described herein can be used in methods of increasing the amount of nitrogen in soil and of enhancing plant growth. Such methods can include applying to the soil an effective amount of a composition containing the fertilizer particles. The method can include increasing the growth and yield of crops such as, for example, rice, wheat, corn, barley, oats, and soybeans.

The effectiveness of the particulate fertilizer compositions described herein can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions. Compositions containing the fertilizer particles described herein can be compared directly to such fertilizers as AGROTAIN® or SUPERU®. AGROTAIN® is sold by Koch Fertilizer, LLC (U.S.A.) and is an NBTPT-containing liquid formulation, with NMP as the main solvent along with other additives to allow for spreading of this liquid onto urea granules, generally at the farm site. Thus, it requires an additional step before being used by the farmer and incorporates the toxic solvent NMP. Tremendous odor is evident during usage. SUPERU® is sold by Koch Fertilizer, LLC and is a formulation of urea containing both NBTPT and DCD prepared by adding these two inhibitors to the urea melt during granulation.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Methods of Making Fertilizer Particles and Analyzing their Properties

A. Materials

Technical grade urea can be obtained from SABIC® (Kingdom of Saudi Arabia). Plaster of Paris, chalk powder and bleached wheat flour were obtained from Bengaluru local markets. Hydroxypropylmethylcellulose (HPMC) was bought from Loba Chemie Pvt. Ltd. N-(n-butyl) thiophosphoric triamide (NBTPT) was purchased from Samich (HK) Ltd., Hangzhou, China. DCD powder was purchased from Sigma Aldrich/AlzChem, Germany.

B. Procedure for Extruding Core Particles

Representative procedure for lab scale extruder: The raw materials needed for formulations are weighed to the nearest accuracy and mixed thoroughly. The compounding operations are carried out in a W &P ZSK25 Twin Screw Extruder with a 25 mm screw diameter on a 6-barrel. The screw configuration is designed with sufficient kneading elements to get maximum shear for better mixing. The experiments are carried out at a processing temperature ranging from 5° C. to 50° C. The temperature of the extrusion process can be controlled by the screw speed used in the extrusion process. Screw speed is between 20-100 rpm and the material is added through the main hopper at 6-8 kg/hr. The temperature of the extrusion process for fertilizer core particles containing plaster of Paris is generally between 20° C. and 50° C. The ingredients are added through the hopper slowly by keeping the load constant. The extrudates are collected as strands and dried at room temperature.

C. Procedure for Coating Core Particles and Granulation

The extruded core particles with either NBTPT or DCD included are provided as described above. Core particles having a longest dimension of 0.7-1.7 mm are chosen for granulation. During the granulation process, active ingredients, such as the inhibitors, are protected inside the core particles by the binder materials used in the formulation. The core particles are placed in the granulator, either together or in separate batches. The core particles are sprayed with a urea melt, which can contain a nitrification inhibitor, inside the granulator to produce the fertilizer particle. The granulated fertilizer core (fertilizer particles) generally have a longest dimension of about 4 mm. The granulating process both fattens the cores with urea and dries the fertilizer granules.

The spray rate of the urea melt can be controlled to control the agglomeration of multiple cores into one fertilizer granule. Round, single, and multi-core fertilizer granules can be produced using this process.

The granulation process parameters that can be used are described in Table 1.

TABLE 1

| Process | Coating |
|---|---|
| Bin | Coating Bin |
| Nozzle | Bottom spray; Diameter 1.2 mm, Air cap 2.6 mm |
| Atomization air pressure | 0.8 bar |
| Distribution plate | Sieve plate with 58% free area |
| Sieve cloth | 1×; 25 µm mesh size |
| Nozzle heating (thermal oil temperature) | 160° C. |
| Liquid tank heating (thermal oil temperature) | 150° C. |
| Atomization air heating | 100° C. |
| Electrical trace heating (tube) | 160° C. |
| Valve I heating (in front of the nozzle) | 160° C. |
| Valve II heating (liquid tank discharge) | 160° C. |

Example 2 (Prophetic Example)

Sample Analysis

The purity of NBTPT and DCD can be cross-checked by NMR, HPLC, and LCMS analysis.

Crush strength can be measured for some of the samples using a crush strength analyzer to determine the strength of the extrudates fertilizer particles.

The stability of inhibitors in the urea melt, core particles, and/or fertilizer particles can be measured using HPLC and LCMS.

The free and total moisture content of extrudates can be measured using a moisture analyzer.

It is expected that the final core-shell fertilizer particles will have the following properties: crush strength (kgf): 1.68-3.60; abrasion analysis (wt loss %): 0.11-0.85; impact resistance (shattered granules %): 0.05-0.64; moisture analysis (wt %): 0.12-0.23; particle size distribution (granule): 2-4 mm (97%); Biuret %: 1.05-3.8; and Nitrogen %: 43.3-46.3.

The nitrogen volatilization and nitrogen transformation (nitrification) will be measured in different soils and compared to urea alone and to products on the market such as AGROTAIN®, ESN®, and SUPERU®. A soil that is representative of a broader class of soil types can be used to measure the nitrogen volatilization and nitrification. Greenville soil and Crowley soil are two such representative soils. Other soils can also be used for the experiments described herein.

Greenville soil or Greenville clay-loam soil is typical of weathered tropical ultisols and is found in warm humid environments. The soil is classified as fine, kaolinitic, thermic Rhodic Kandiudults with a pH of 6.1-6. The soil has organic matter of 1.4%, total amount of nitrogen is about 0.06%, and the CEC is 5.2 cmol/kg. Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exists in nearly level to very gently sloping soils and occurs on flat coastal plains terraces. The slope is dominantly less than 1 percent but ranges to up to 3 percent. The mean annual precipitation is about 1549 mm (61 in.), and the mean annual air temperature is about 20 degrees C. (68 degrees F.), where the soil is found. The soil is fine, smectitic, and thermic Typic Albaqualfs.

The nitrogen volatilization of various exemplary samples of the particulate fertilizer composition of the invention as compared to AGROTAIN®, ESN®, SUPERU®, and urea will be determined as the percentage of nitrogen loss via ammonia volatilization as compared to the amount of nitrogen applied or as the absolute mass of nitrogen lost via ammonia volatilization. It is expected that embodiments of the fertilizer composition disclosed herein will lose less than 20 wt % of the applied nitrogen after being exposed to soil for 20 days. It is also expected that embodiments of the fertilizer composition disclosed herein will lose less than 20 wt % of the applied nitrogen after being exposed to Greenville soil for 20 days and less than 20 wt % of the applied nitrogen after being exposed to Crowley soil for 20 days. It is also expected that embodiments of the fertilizer particles disclosed herein will have lower levels of ammonia volatilization and/or nitrogen loss than AGROTAIN®, ESN®, and/or SUPERU® tested under substantially identical conditions in a given soil, which can include Greenville soil, Crowley soil, or other soils.

The invention claimed is:

1. A particulate fertilizer composition comprising:
   (a) a first particle comprising a first core particle and a first shell, wherein the first core particle comprises a urease inhibitor and is substantially free of any nitrification inhibitor and the first shell comprises a nitrogen containing fertilizer composition; and
   (b) a second particle comprising a second core particle and a second shell, wherein the second core particle comprises a nitrification inhibitor and is substantially free of any urease inhibitor and the second shell comprises a nitrogen containing fertilizer composition,
   wherein the first particle and the second particle are separate and not bound together.

2. The particulate fertilizer composition of claim 1, wherein the second shell further comprises a nitrification inhibitor.

3. The particulate fertilizer composition of claim 1, wherein the urease inhibitor comprises N-(n-butyl) thiophosphoric triamide (NBTPT) and the nitrification inhibitor comprises dicyandiamide (DCD).

4. The particulate fertilizer composition of claim 3, wherein the NBTPT is between 1 and 5 wt % of the first core particle and the DCD is between 10 and 50 wt % of the second core particle.

5. The particulate fertilizer composition of claim 1, wherein the first core particle and the second core particle further comprise a binder comprising one or more of plaster of Paris, flour, biodegradable bleached wheat flour, starch, colloidal silica, kaolin, bentonite, or gluten.

6. The particulate fertilizer composition of claim 1, wherein the first core particle and the second core particle further comprise a filler comprising one or more of silica, dried distillers grains with solubles (DDGS), or rice husk.

7. The particulate fertilizer composition of claim 1, wherein the first core particle and the second core particle further comprise a pH buffering agent comprising one or more of chalk powder, $CaCO_3$, MgO, $KH_2PO_4$, $NaHCO_3$, $Na_2CO_3$, or $K_2CO_3$.

8. The particulate fertilizer composition of claim 1, wherein the particulate fertilizer composition comprises a plurality of first particles and a plurality of second particles, and wherein the weight ratio of the first particles to the second particles is approximately 1:1.

9. The particulate fertilizer composition of claim 1, wherein the first core particle comprises 10 to 94 wt % binder, 0 to 60 wt % filler, 5 to 60 wt % pH balancing agent, and 1 to 5 wt % NBTPT, and wherein the second core particle comprises 10 to 85 wt % binder, 0 to 50 wt % filler, 5 to 60 wt % pH balancing agent, and 10 to 50 wt % DCD.

10. The particulate fertilizer composition of claim 1, wherein the weight ratio of the first shell to the first core particle and of the second shell to the second core particle is between about 40:1 and 5:1.

11. The particulate fertilizer composition of claim 1, wherein the first core particle and second core particle are between about 0.5 and 2 mm in diameter and wherein the first particle and the second particle are between about 1 and 8 mm in diameter.

12. The particulate fertilizer composition of claim 1, wherein the particulate fertilizer composition comprises sufficient urease inhibitor and nitrification inhibitor so that less than 20 wt % of nitrogen in the particulate fertilizer composition is lost via ammonia volatilization after being exposed to Greenville soil or Crowley soil for 20 days.

13. A particulate fertilizer composition comprising:
(a) a plurality of first particles, each first particle comprising:
   (i) a first core particle comprising N-(n-butyl) thiophosphoric triamide (NBTPT) and a binder; and
   (ii) a urea-containing fertilizer composition in contact with the outer surface of the first core particle; and
(b) a plurality of second particles, each second particle comprising:
   (i) a second core particle comprising dicyandiamide (DCD) and a binder; and
   (ii) a urea-containing fertilizer composition in contact with the outer surface of the second core particle,
wherein the first particle and the second particle are separate and not bound together, and wherein each of the first particles are substantially free of any nitrification inhibitor, and each of the second particles are substantially free of any urease inhibitor.

14. The particulate fertilizer composition of claim 13, wherein the urea-containing fertilizer composition in contact with the outer surface of the second core particle further comprises DCD.

15. The particulate fertilizer composition of claim 13, comprising a plurality of the first particles and a plurality of the second particles, wherein the particulate fertilizer does not comprise a plurality of particles comprising a urea-containing fertilizer without a core particle, and wherein the weight ratio of the first particles to the second particles is approximately 1:1.

16. The particulate fertilizer composition of claim 13, wherein the weight ratio of the first particles to the second particles is approximately 1:1.

* * * * *